United States Patent

[11] 3,633,522

[72] Inventor  Ronald S. Main
              RMB 467 Kootingal, New South Wales, Australia 2352
[21] Appl. No. 809,908
[22] Filed     Mar. 24, 1969
[45] Patented  Jan. 11, 1972
[32] Priority  Apr. 1, 1968
[33]           Australia
[31]           35819

[54] SOD SEEDERS
     2 Claims, 5 Drawing Figs.
[52] U.S. Cl. ............................................. 111/69, 111/86
[51] Int. Cl. .......................................... A01c 5/06, A01c 7/16
[50] Field of Search ............................. 111/86, 69, 10, 79; 222/145, 561, 524, 526, 569, 478, 465

[56]         References Cited
         UNITED STATES PATENTS

| | | | |
|---|---|---|---|
| 474,430 | 5/1892 | Wells............................ | 111/86 |
| 3,509,947 | 5/1970 | Garst............................ | 111/86 |
| 332,602 | 12/1885 | Glisson......................... | 111/69 |
| 388,485 | 8/1888 | Grubb........................... | 222/561 |
| 806,507 | 12/1905 | Sober............................ | 111/10 |
| 2,292,909 | 8/1942 | Thoma et al.................. | 111/86 |
| 3,044,666 | 7/1962 | Dyer............................. | 222/145 |
| 3,383,442 | 5/1968 | Mountain..................... | 222/145 X |

Primary Examiner—Robert E. Pulfrey
Assistant Examiner—Stephen C. Pellegrino
Attorney—Holman & Stern ABSTRACT: A sod seeder for sowing pasture seed or other like particulate matter, detachably attachable to the lower portion of and rearwardly of a tilling tine so that the seed or like particulate matter will be distributed evenly and at a constant rate into the furrow and below the sod.

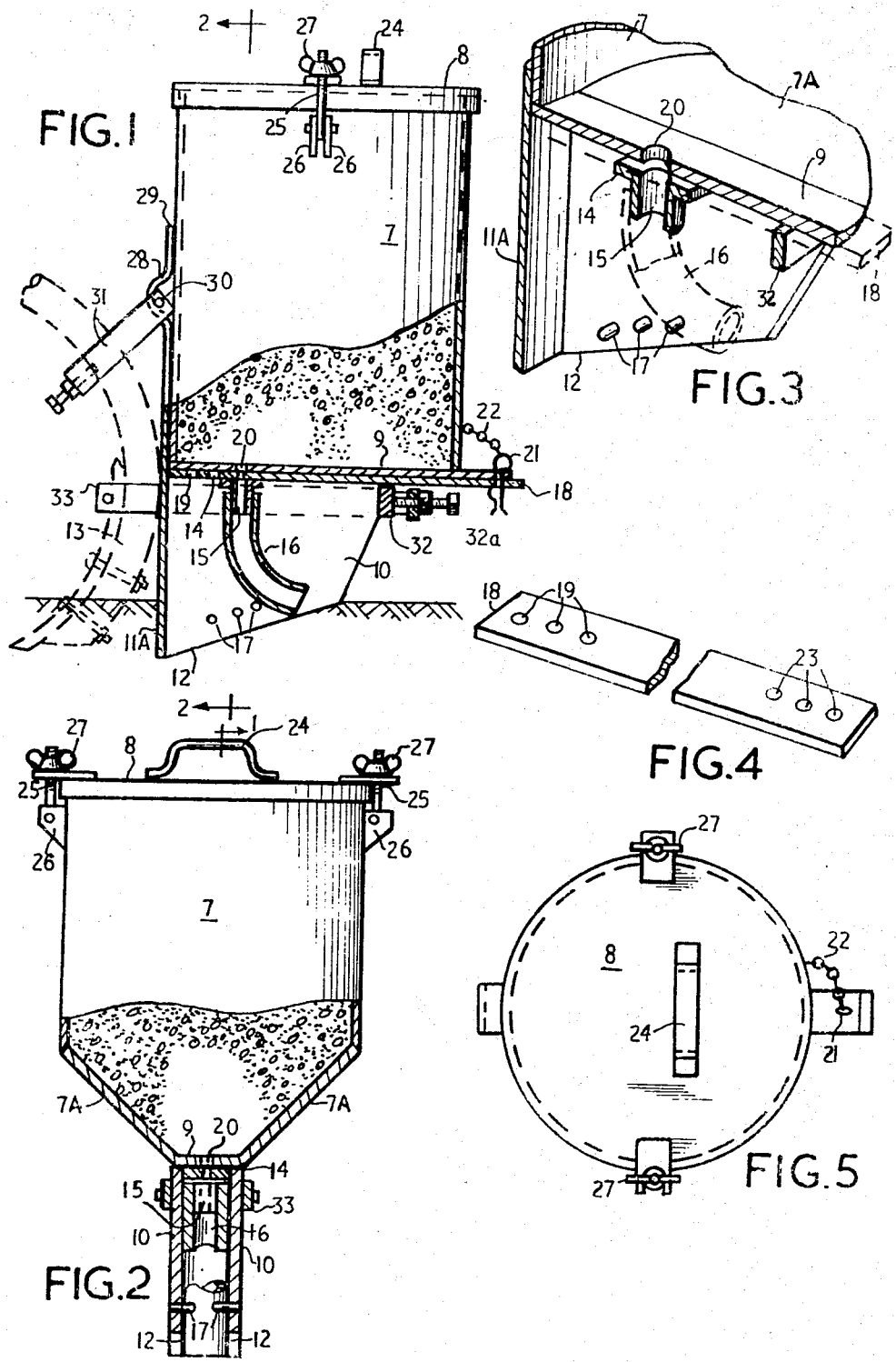

SOD SEEDERS

BACKGROUND OF THE INVENTION

This invention relates to improvements in sod seeders for sowing pasture seed or other analogous particulate matter, such as for example fertilizer or other chemicals.

The object of the invention is to provide a simple and cheap combination construction in the form of a universal sod seeder detachably attached to the lower portion of and rearwardly of a tilling time in a requisite operative position and to an extent irrespective of the shape or type of tine or tiller or "chisel" plow.

The object of the present invention is to provide a sod seeder of a character such as to ensure that the seed or like particulate material will effectually find its way into the furrow and below the sod and will be distributed evenly at a constant rate of discharge.

SUMMARY OF THE INVENTION

This object is achieved according to the invention by providing a sod seeder comprising means for regulating the direction and depth of delivery of seed or other like particulate material into a furrow according to particular requirements and further comprising means for utilizing the special combined up and down, forward and backward motion of the lower portion of the tine in operation, and transmitting this motion to vibrate the contents of the sod seeder so that the seed or other like particulate material is discharged from the said seeder evenly and at a constant rate.

Accordingly, the invention provides a sod seeder having one or more compartments and adapted to contain seed or other like particulate material for discharge therefrom, adapted for attachment to the lower portion and rearwardly of a tilling tine, with the sod seeder comprising a box and a boot mounted below the box, the boot having a pair of opposite parallel sidewalls, the lower edge of at least one sidewall tapering upwards from front to rear relative to the direction of sowing, and adjustment means for adjusting the position in the direction of sowing at which seed is delivered from the box to the soil to control the depth of sowing.

The apparatus of the invention controls the time of soil return relative to the time of seed delivery, thus enabling the amount of soil covering the seed to be varied, thereby controlling the depth of sowing. The sowing depth is inversely proportional to the distance from the tine of the seed delivery means.

Preferably, the time of soil return is controlled by shaping the sidewalls of the seed sowing boot with inclined edges.

Moreover, the seed delivery means comprises an adjustable tiltable deflector plate, or a metal tube affixed to a holed crosspiece and in register with the seed sowing boot, with the metal tube being downwardly disposed within the seed sowing boot and having a flexible feed tube extending from the lower and thereof. Means for adjustably positioning the flexible tube to deliver seeds away from the seed sowing boot into a furrow in a required direction and depth are also provided.

The means whereby the flexible feed tube may be adjustably positioned includes a series of suitably distanced oppositely disposed locating pins extending inwardly from oppositely disposed inside wall portions of the seed sowing boot, with the lowermost end of the flexible feed tube being positioned and supported between or against selected pairs or a selected pair of the locating pins according to the direction required for delivery of seed into the furrow.

Intermediate of the holed bottom end of the seed box and of the holed crosspiece may be a slidably fitted seed plate having formed through an inner end portion thereof distanced seed holes of varying diameters so that a selected one of the seed holes may be slid into coregister with the hole in the bottom end of the seed box to be retained in such coregistering position by means of an anchored retaining pin inserted through a retaining hole provided in side extension of the bottom of the seed box and through a selected one of a plurality of suitably distanced pin retaining holes formed in an outer end portion of the slidably fitted seed plate.

The seed sowing boot portion may be formed with two side plates disposed in parallelism projecting downwardly from and below the seed box, the front ends of the said side plates being connected by a front end or wall, cover plate and the rear and bottom ends or edges of the side plates being open that is to say having no end or wall coverings, with the bottom ends or edges of the side plates being inclined upwardly from their front to their rear ends.

The main body portion of the seed box may be of circular cross-sectional form and fitted with a lid provided with a handle, the lid, when in the closed position, being secured in such position by diametrically oppositely disposed swing bolts fitted with wing nuts which swing bolts are attached to outside wall portions of the seed box with a lower portion of the latter being "V"-shaped with inclined flat side portions terminating in the holed bottom end which is horizontally disposed and of rectangular form.

The front wall surface of the seed box may have affixed thereto a bar having an eye to accommodate a pin to secure in position an upper U-shaped clamp to be utilized to assist in holding the combination appliance firmly to a tine of a tilling implement, the seed sowing boot portion being fitted with an adjustable crossbar whose front end carriers a lower U-shaped clamp to be also used to assist in holding the combination appliance firmly to a tine of a tilling implement.

In order for the invention and the details of construction of an appliance according to the invention to be clearly understood, reference will now be made to the accompanying drawings which serve to illustrate an exemplary embodiment of the invention.

BRIEF DESCRIPTION OF THE DRAWINGS

In the drawings wherein like reference numerals refer to like parts in the several views, FIG. 1 is a view taken along the line 1—1 of FIG. 2, the view looking in the direction of the arrows;

FIG. 2 is a view taken along the line 2—2 of FIG. 1, the view looking in the direction of the arrows;

FIG. 3 is a fragmentary perspective view partly in elevation and partly in section of a seed sowing boot portion showing locating pins for the adjustably positioned flexible feed tube, the locating pins extending inwardly from an inside wall portion of the seed sowing boot, and FIG. 4 is a perspective view of a slidably fitted seed plate, FIG. 5 is a plan view of FIG. 1, with U-clamp omitted.

Referring to the drawings a seed box, container or hopper 7 has a main body portion of circular cross-sectional form and is fitted with a lid 8 provided with a handle 24, the lid 8, when in the closed position, being secured in such position by diametrically oppositely disposed swing bolts 25 fitted with wing nuts 27, with the swing bolts 25 being attached to outside wall portions of the seed box 7 by means of lugs 26. The lower portion of the seed box 7 is V-shaped with inclined flat side portions 7A terminating in a holed bottom end 9 which is horizontally disposed and of rectangular form. Hole 20 formed through the bottom end 9 of the seed box, 7 is clearly shown in FIGS. 1 and 2.

The main body portion of the seed box 7 may, in particular, be varied within wide limits in regard to its shape or contour.

The appliance has a seed sowing boot portion which, in the example shown has two side plates 10 disposed in parallelism projecting downwardly from and below the seed box 7.

Front ends 11 of the side plates 10 are connected by or formed with a front end, wall or cover plate indicated generally 11A.

The rear and bottom edges of the side plates 10 are open that is to say they have no end or wall coverings.

The bottom ends or edges of the side plates 10 are inclined upwardly from their front to their rearward ends. In other words, such edges incline downwardly towards tines 13 (one tine 13 shown in broken lines in FIG. 1) of the tilling implement as clearly shown at 12 in FIGS. 1 and 3. This arrangement is of importance since the inclined bottom edges 12 of the seed sowing boot portion function, in relation to the tilled soil, sod or furrow and conjointly with an adjustably positioned seed feed delivery tube later described and which constitutes a feature of the invention, to govern the depth within the furrow to which the seed is sown and which depth varies according to particular requirements.

The front wall surface of the seed box 7 has a bar 29 affixed thereto as by welding and the bar 29 is provided with an eye to accommodate a grooved pin 30 to secure in position an upper U-shaped clamp 31 utilized to assist in holding the combination appliance firmly to a tine 13 of a tilling implement.

The boot portion is provided with a crosspiece 32 located between the upper portions of the rear edges of the sides of the boot portion and serves as a support for a slidable seed plate to be later described and also provides a bearing surface for a lower U-shaped clamp 33 used to assist in holding the appliance firmly to the tine 13, with the crosspiece 32 taking the thrust when the lower U-shaped clamp 33 is tightened by means of a tightening screw 32a.

Intermediate of the bottom end 9 of the seed box 7 and an upper end portion of the sowing boot portion is a holed crosspiece 14 to which is affixed with its upper end in coregister with the hole of the holed crosspiece 14 a short metal tube 15 which is downwardly disposed and within the seed sowing boot and from whose lowermost end extends a longer flexible seed feed tube 16 formed of flexible plastic resinous material.

The flexible seed feed tube 16 constitutes a particular feature of the present invention and is arranged so that it may be adjustably positioned to fulfil its function which is to deliver separate seeds from its lowermost end and away from the seed sowing boot into the furrow and in a direction according to the sowing depth required for the seed within the furrow.

The means whereby the flexible seed feed tube 16 may be adjustably positioned consist of a series of suitably distanced oppositely disposed locating pins 17 extending inwardly from oppositely disposed inside wall portions of the seed sowing boot, with the lowermost end of the flexible seed feed tube 16 being positioned and supported between or bearing against selected pairs or a selected pair of the locating pins 17.

It will be seen that, by such means, the position of the end of the flexible seed feed tube 16 may be altered according to particular requirements and to the direction and depth required for delivery of seed into the furrow.

Intermediate of the bottom end 9 of the seed box 7 and of the crosspiece 32 is a slidably fitted seed plate 18 having formed through an inner end portion thereof axially spaced seed holes 19 of varying diameters (FIG. 4) so that a selected one of the seed holes 19 may be slid into coregister with the hole 20 of the bottom end 9 of the seed box 7.

The selected one of the seed holes 19 is retained in such coregistering position by means of a retaining pin 21 which is anchored by a chain 22 to the box 7 and which retaining pin 21 is inserted through a pin retaining hole formed through a side extension of the bottom of the seed box 7 and through a selected one of a plurality of suitably distanced pin retaining holes 23 in an outer end portion of the seed plate 18.

By adjusting the seed plate 18 according to requirements, the rate of sowing of the seed can be varied.

There may be employed more than one of the flexible seed feed tubes 16 each with its associated parts as above described but generally only one of the same would be used.

In operation, during forward movement of tines 13 of a tilling implement below the ground level the inclined bottom edges 12 of the sowing boot portion, in relation to the tilled soil, sod or furrow and conjointly with the adjustably positioned seed feed delivery tube, serve admirably to govern the depth within the furrow to which the seed is sown and which required depth varies with different requirements related to different conditions.

The more forward the positioning of the delivery end of the seed feed delivery tube 16 that is to say the nearer it is to the tine 13, the greater will be the depth to which the seed is sown.

Conversely, the more rearward the positioning of the delivery end of the seed feed delivery tube 16 that is to say the further it is away from the tine 13, the lesser will be the depth to which the seed is sown.

More specifically, when the tube 16 is in the rear position, due to the inclined bottom edges 12, loose particles of soil agitated by the vibrating tine tip fall back into the furrow before the seed is delivered thereby ensuring shallow sowing which is desirable for pasture seeds. On the other hand, when the tube 16 is in the forward position, the seed is delivered to the bottom of the furrow before the loose soil falls back into the furrow thus burying the seed deeply which is desirable for cereals and other large seeds.

An appliance according to the invention can be very speedily and conveniently attached to or detached from a tine of a tilling implement and has no moving parts so that wear and maintenance costs may be kept to a minimum.

The present appliance is of character capable of being very cheaply and economically produced and in operation it achieves its objectives in very satisfactory manner.

The invention is generally subject to modifications in regard to details of design and construction and in regard to materials utilized in manufacture, within the scope of the appended claims.

For example, means may be incorporated which render visible the flow of seed by gravitation.

Also, there could be extra seed holes formed through the seed plate 18.

The seed box may be divided internally to hold seed in one compartment and fertilizer in another or to hold two different varieties of seed which may be discharged through two different metal tubes, or be deflected by means of two separate tiltable deflecting plates.

Slidable seed-plates may also be located inside the seed box directly above the hole in the bottom of the seed box, and may be circular in shape.

The seed sowing aperture may also be varied by means of a mechanism similar to that used to vary the amount of light admitted to the lens of a camera.

If desired a compression wheel or slide preferably spring loaded, may be fitted to the rear of the sowing boot when conditions so require.

For certain difficult to sow seeds and fertilizer, a vertically mounted spring loaded slidable push rod may be located in the seed box over the sowing hole so that the vibration of the seed box will agitate the push rod up and down, forcing seed through the hole. This feature is particularly useful when sowing Townsville lucerne seed.

What is claimed is:

1. A sod-seeder including a combination seed box and sowing boot, a spring tine, means attaching the combination seed box and sowing boot to the lower portion of and to the rear of the spring tine, said seed box having at least one compartment provided with at least one hole communicating with the sowing boot, said sowing boot including a pair of spaced parallel sidewalls, a front wall, an open bottom and rear, the lower ends of the sidewalls being inclined upwardly from front to rear relative to the direction of sowing, a flexible tube within the boot in communication with the hole in the compartment, and a plurality of spaced stops extending inwardly into the boot from each sidewall arranged in parallelism to the upwardly inclined lower ends of the sidewalls, said tube being movable to one of said stops and supported thereon to adjust the position of the tube relative to the open bottom of the boot for delivering the contents, said combination seed box and sowing boot being attached to the tine so that the bottom of the sowing boot is generally slightly above the tip of the tine, whereby upon the seeder being pulled through the ground, the forward, rearward, upward and downward vibratory motion of the lower portion of the tine is transmitted to the seed box and the contents thereof for ensuring a substantially constant rate of sowing.

2. The sod-seeder as claimed in claim 1 including a plate mounted for sliding movement between the hole in the compartment and the flexible tube within the boot, and said slidable plate having a plurality of axially spaced apertures of different diameters so that a selected aperture can be brought into registry with the hole in the compartment for varying the sowing rate of the contents.

* * * * *